US008550254B2

(12) United States Patent
Kobayashi

(10) Patent No.: US 8,550,254 B2
(45) Date of Patent: Oct. 8, 2013

(54) LIQUID EJECTING HEAD AND LIQUID EJECTING APPARATUS HAVING RESIN WRAPPED FILTER

(75) Inventor: Hiroyuki Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 345 days.

(21) Appl. No.: 12/861,070

(22) Filed: Aug. 23, 2010

(65) Prior Publication Data

US 2011/0050821 A1 Mar. 3, 2011

(30) Foreign Application Priority Data

Aug. 26, 2009 (JP) ................................ 2009-195984

(51) Int. Cl.

| | |
|---|---|
| ***B01D 35/02*** | (2006.01) |
| ***B41J 2/175*** | (2006.01) |
| *B41J 2/19* | (2006.01) |

(52) U.S. Cl.

USPC ................................ 210/445; 347/85; 347/93

(58) Field of Classification Search

USPC ........................................................ 210/445

See application file for complete search history.

(56) References Cited

U.S. PATENT DOCUMENTS

| | | | | |
|---|---|---|---|---|
| 3,935,110 | A * | 1/1976 | Schmid et al. | 210/445 |
| 5,049,274 | A * | 9/1991 | Leason et al. | 210/445 |
| 5,556,541 | A * | 9/1996 | Ruschke | 210/445 |
| 6,375,669 | B1 * | 4/2002 | Rosenbluth et al. | 606/200 |
| 2008/0093289 | A1 * | 4/2008 | Zia | 210/445 |
| 2008/0314108 | A1 * | 12/2008 | Tonami et al. | 347/47 |
| 2009/0122125 | A1 | 5/2009 | Owaki et al. | |
| 2009/0207222 | A1 | 8/2009 | Kamikura | |
| 2009/0212460 | A1 | 8/2009 | Kamikura | |
| 2009/0213199 | A1 | 8/2009 | Owaki et al. | |
| 2009/0225142 | A1 | 9/2009 | Kamikura | |

FOREIGN PATENT DOCUMENTS

| | | |
|---|---|---|
| JP | 2000-211130 | 8/2000 |
| JP | 2009-113250 | 5/2009 |
| JP | 2009-132135 | 6/2009 |
| JP | 2009-190278 | 8/2009 |
| JP | 2009-196224 | 9/2009 |
| JP | 2009-208450 | 9/2009 |
| JP | 2009-220567 | 10/2009 |
| JP | 2009-255431 | 11/2009 |

* cited by examiner

*Primary Examiner* — Shelby Fidler

(74) *Attorney, Agent, or Firm* — Workman Nydegger

(57) ABSTRACT

A liquid ejecting head includes a head body that has a nozzle opening for ejecting liquid supplied via a liquid supply path. A first supply member for the liquid supply path has an introduction port for introducing the liquid. A second supply member is positioned on a downstream side of the first supply member. A filter between the first and second supply members crosses the liquid supply path. An integrated molding portion fixes the first and second supply members by resin in a state where the filter is pinched between the first and second supply members. The first and second supply members have pinching portions for pinching the filter therebetween. A wall surface is positioned on one of the first and second supply members and between the filter and the resin to surround an outer periphery of the filter.

8 Claims, 11 Drawing Sheets

LIQUID EJECTING HEAD AND LIQUID EJECTING APPARATUS HAVING RESIN WRAPPED FILTER

The entire disclosure of Japanese Patent Application No: 2009-195984, filed Aug. 26, 2009 are expressly incorporated by reference herein.

BACKGROUND

1. Technical Field

The present invention relates to a liquid ejecting head and a liquid ejecting apparatus for ejecting liquid, and more particularly, to a liquid ejecting head which is useful as an ink jet recording head for discharging ink as liquid.

2. Related Art

In an ink jet recording head which is a representative example of a liquid ejecting head, generally, ink is supplied to a head body from an ink cartridge that is a liquid storage unit filled with ink via an ink supply needle that is an ink supply element inserted into the ink cartridge so as to be attachable and detachable and an ink channel provided in a supply member such as a cartridge case for holding the ink cartridge, and the ink, which is supplied to the head body by driving a pressure generating unit such as a piezoelectric element provided in the head body, is discharged from a nozzle.

In such an ink jet recording head, there is a problem in that if there are bubbles in ink in the cartridge, or bubbles, which are incorporated into the ink while the ink cartridge is attached or detached, are supplied to the head body, there is discharge defects such as dot missing due to the bubbles.

In order to solve the problem, there is disclosed an ink jet recording head provided with a filter for removing bubbles and dirt in ink between an ink supply needle inserted into an ink cartridge and a supply member (for example, refer to JP-A-2000-211130).

In the ink jet recording head disclosed in JP-A-2000-211130, the filter and the supply member are fixed to each other by thermal welding or the like, and the ink supply needle and the supply member are fixed to each other by ultrasonic welding.

However, in the configuration as disclosed in JP-A-2000-211130, there are problems in that since the filter is provided in a space where the ink supply needle of the supply member is fixed, the space according to an area of the filter is needed, and since a region for individually welding the ink supply needle and the filter to the supply member is needed, an interval between the adjacent ink supply needles cannot be reduced and this results in an increase in the size of a head.

Therefore, in order to solve the problem and achieve a reduction in the size of the ink jet recording head, there is proposed an ink jet recording head in which a filter is pinched between an ink supply needle and a supply member and in this state the ink supply needle and the supply member are formed integrally with each other by resin molding (for example, refer to JP-A-2009-132135).

The ink jet recording head disclosed in JP-A-2009-132135 employs a structure in which when the ink supply needle and the supply member are formed integrally with each other by resin molding, resin is wrapped to a part of a periphery of the filter pinched between the ink supply needle and the supply member so that the filter is fixed to the ink supply needle and the supply member also by the resin.

However, in the structure as disclosed in JP-A-2009-132135, since the filter is wrapped by the resin, a pinching portion of the filter is deformed due to an injection pressure or shrinkage of the filling resin during the resin molding, and accordingly twisting of the filter occurs. In addition, the filter is adhered to the channel. As a result, pressure loss increases, and simultaneously, there is a new problem in that defoaming performance is degraded.

This problem occurs also in the liquid ejecting head for ejecting liquid other than ink, as well as in the ink jet recording head.

SUMMARY

An advantage of some aspects of the invention is that it provides a liquid ejecting head and a liquid ejecting apparatus.

According to an aspect of the invention, there is provided a liquid ejecting head including: a head body that has a nozzle opening for ejecting liquid supplied via a liquid supply path; a first supply member that is provided with the liquid supply path and has an introduction port for introducing the liquid; a second supply member that is disposed on a downstream side of the first supply member and is provided with the liquid supply path; a filter that is provided between the first and second supply members to cross the liquid supply path; and an integrated molding portion that fixes the first and second supply members by resin in a state where the filter is pinched between the first and second supply members, wherein the first and second supply members are provided with pinching portions for pinching the filter therebetween, and a wall surface is provided on one of the first and second supply members, and the wall surface is provided between the filter and the resin to surround an outer periphery of the filter.

According to the aspect, resin for integrated molding comes in contact with an outer periphery of a wall portion and thus does not come in contact with the filter, so that there is no exertion of a force caused by an injection pressure or shrinkage of the molded resin on the filter.

As a result, twisting of the filter due to the resin molding is prevented, pressure loss is prevented, and defoaming performance can be properly maintained.

Here, the other of the first and second supply members may be provided with a groove portion for accommodating at least a part of the wall portion. Accordingly, the resin isolation effect can be reliably achieved by the wall portion for the filter.

In addition, the wall portion may be able to be elastically deformed, and a space that faces the groove portion may be provided between an inner peripheral surface of the wall portion and an outer peripheral surface of the filter. In the case where a pressing force of the integrated resin is exerted on the wall portion, the wall portion elastically deforms toward the space. Therefore, a caulking effect is exhibited between a front end of the wall portion and the groove portion, and an exertion of the injection pressure of the molded resin on the pinching portion of the filter or an exertion of an external force due to shrinkage can be reduced.

In addition, a surface of the wall portion which is in contact with the resin may be provided with a groove. In this case, it is possible to improve the adhering force due to the increase in the adhering area between the wall portion and the resin.

According to another aspect of the invention, there is provided a liquid ejecting apparatus including the liquid ejecting head described above.

According to the another aspect, the liquid ejecting head which has a small size, exhibits good defoaming performance without any twisting of the filter, and has a small pressure loss can be implemented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail.

Figure 1:
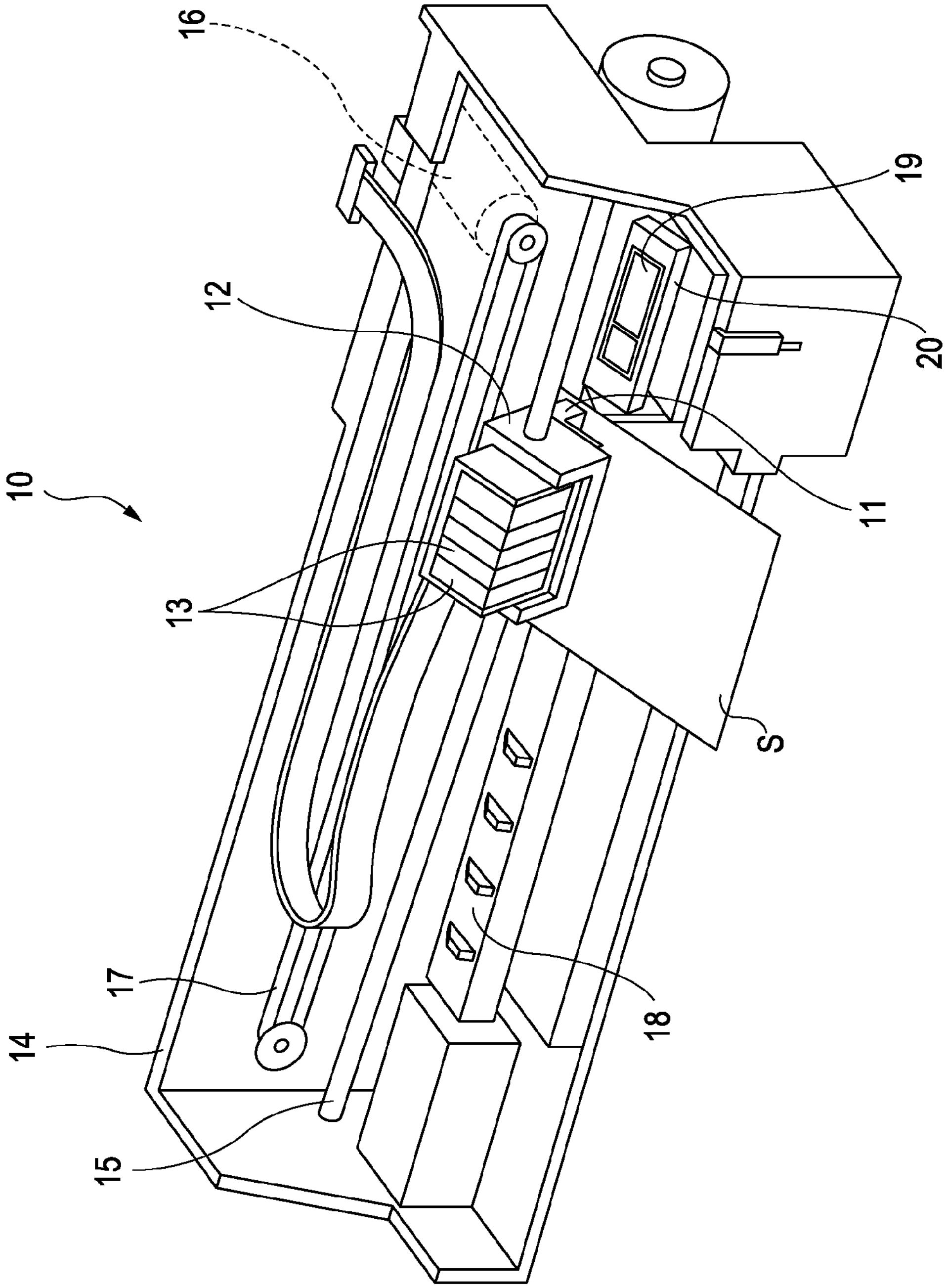
FIG. 1 is a perspective view schematically illustrating a recording apparatus according to an embodiment of the invention.

FIG. 1 is a perspective view schematically illustrating an ink jet recording apparatus which is an example of a liquid ejecting apparatus according to an embodiment of the invention. In the ink jet recording apparatus 10 according to this embodiment of the invention, as illustrated in FIG. 1, an ink jet recording head (hereinafter, referred to as a recording head) 11 which is an example of the liquid ejecting head for discharging ink droplets is fixed to a carriage 12, and an ink cartridge 13 which is a liquid storage unit for storing a plurality of colors of ink such as black (B), light black (LB), cyan (C), magenta (M), yellow (Y), and the like is fixed to the recording head 11 so as to be attachable and detachable.

The carriage 12 in which the recording head 11 is mounted is provided to be moved along an axis of a carriage shaft 15 attached to an apparatus body 14. In addition, as a driving force of a driving motor 16 is transmitted to the carriage 12 via a plurality of gears (not shown) and a timing belt 17, the carriage 12 is moved along the carriage shaft 15. The apparatus body 14 is provided with a platen 18 along the carriage shaft 15 such that a recording medium S such as a paper fed by a feeding device or the like (not shown) is transported on the platen 18.

In addition, at a position corresponding to a home position of the carriage 12, that is, in the vicinity of an end portion of the carriage shaft 15, a capping device 20 having a cap member 19 for sealing a nozzle formation surface of the recording head 11 is provided. By sealing the nozzle formation surface provided with a nozzle opening using the cap member 19, drying of ink is prevented. In addition, the cap member 19 functions as an ink accommodation unit during a flushing operation.

Figure 2:
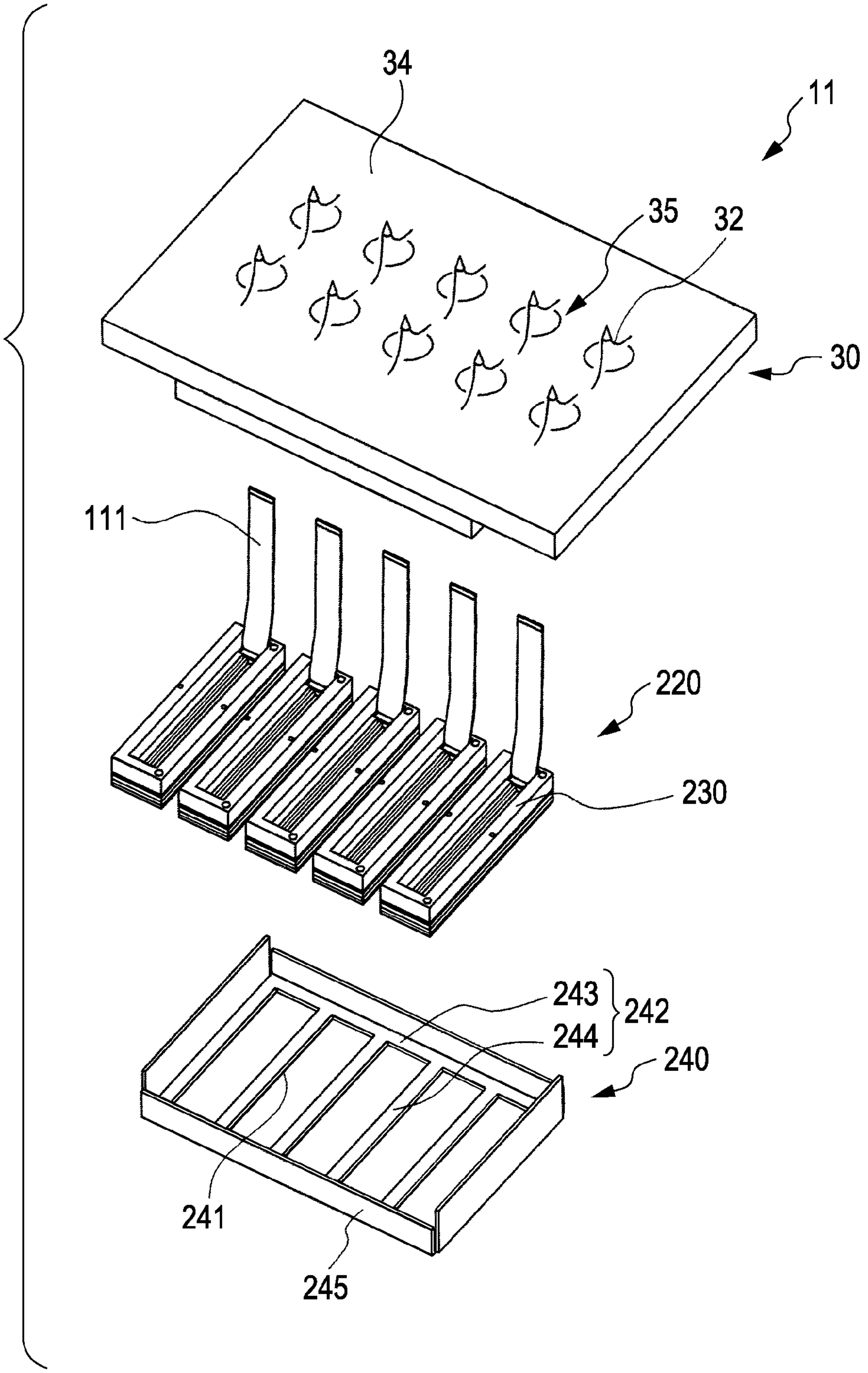
FIG. 2 is a perspective view of a breakdown of a recording head according to the embodiment of the invention.

Here, the recording head 11 according to this embodiment will be described. FIG. 2 is a perspective view schematically illustrating the ink jet recording head which is the example of the liquid ejecting head according to this embodiment.

As illustrated in FIG. 2, the recording head 11 includes a supply member 30 such as a cartridge case to which the ink cartridge 13 as the liquid storage unit is fixed, a head body 220 fixed to a surface on the opposite side to the ink cartridge 13 of the supply member 30, and a cover head 240 provided on a side of a liquid ejecting surface of the head body 220.

Figure 3:
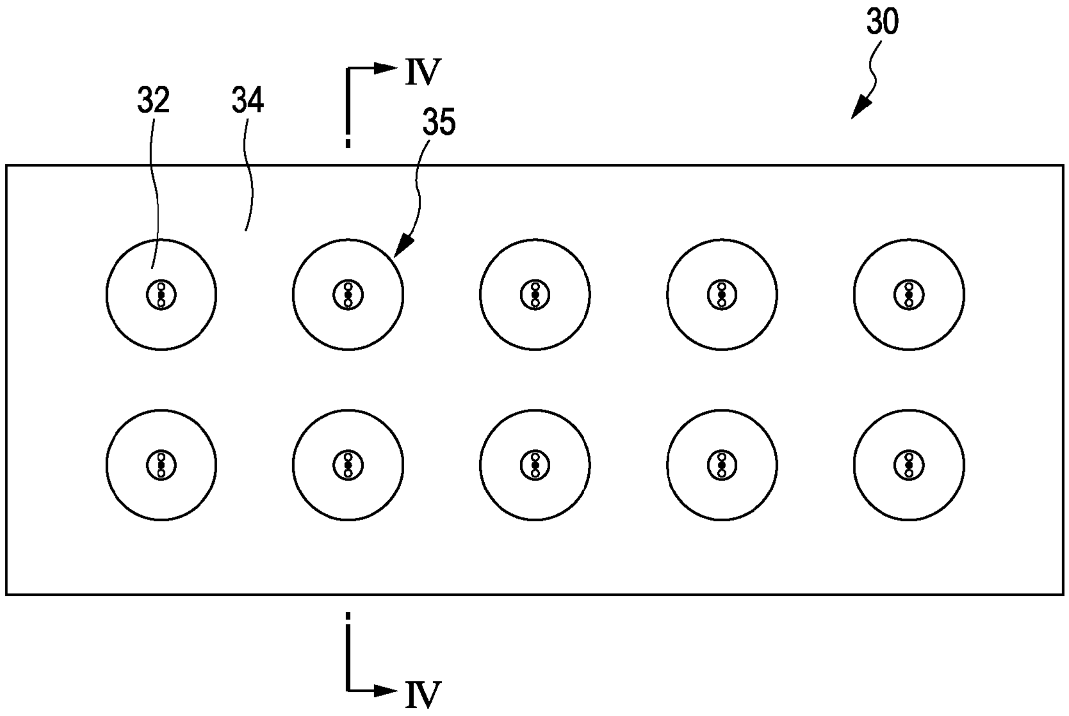
FIG. 3 is a top view of a supply member according to the embodiment of the invention.

First, the supply member 30 will be described in detail. FIG. 3 is a top view of the supply member, and FIG. 4 is an enlarged cross-sectional view taken along the line IV-IV of FIG. 3.

Figure 4:
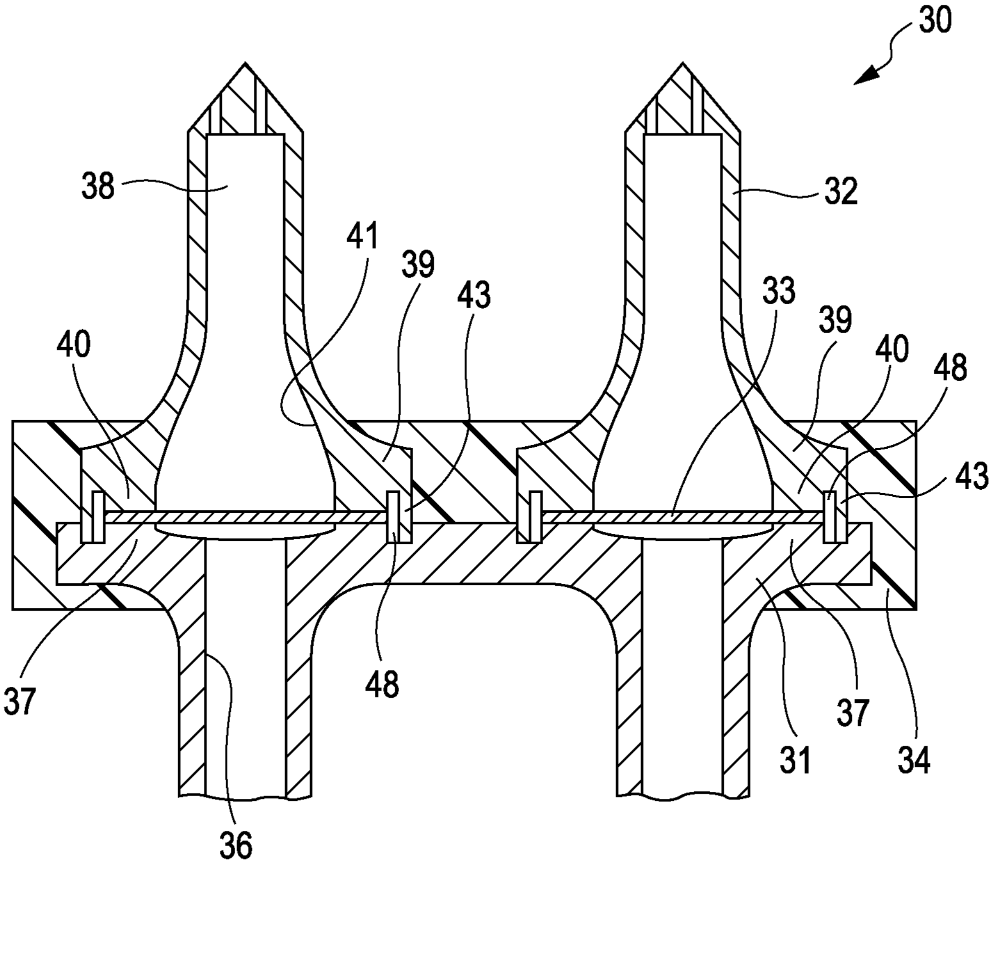
FIG. 4 is a cross-sectional view of the supply member according to the embodiment of the invention.

As illustrated in FIG. 4, the supply member 30 includes a filter attachment member 31 corresponding to a second supply member in this embodiment, a supply needle 32 which is a first supply member provided on a side surface of the filter attachment member 31, a filter 33 provided between the filter attachment member 31 and the supply needle 32, and an outer portion 34 which is a portion molded integrally with the filter attachment member 31 and the supply needle 32 by resin provided on outer peripheries thereof. The above-mentioned ink cartridges 13 are each mounted to a side surface of the supply member 30.

In addition, since the filter attachment member 31 is located on a downstream side from the filter 33 described later, one end is open to the upper portion of filter attachment member 31, and the other end thereof is open to a side of the head body 220. In addition, the filter attachment member 31 is provided with a liquid supply path 36 for supplying ink from the ink cartridge 13 to the head body 220. A plurality of the liquid supply paths 36 is arranged in a longitudinal direction of the filter attachment member 31, and the liquid supply paths 36 are individually provided for the ink cartridges 13 depending on ink colors.

In addition, the filter attachment member 31 is provided with a pinching portion 37 over a periphery of an area where each liquid supply path 36 is open. On the other hand, a pinching portion 40 is formed on a portion opposed to the pinching portion 37 in the supply needle 32. The filter 33 is pinched by the filter attachment member 31 and the supply needle 32 as an outer peripheral portion of the filter 33 comes in contact with the pinching portions 37 and 40.

That is, the supply needle 32 has a flange portion 39 in the vicinity of an end portion thereof on a side of the filter attachment member 31, and an area of the flange portion 39 corresponding to the pinching portion 37 is the pinching portion 40.

Here, the supply needle 32 as a supply element is fixed to a surface of the filter attachment member 31 and includes a penetration path 38 which communicates with the liquid supply path 36. The supply needle 32 is a member for supplying ink supplied from the ink cartridge 13 to the filter attachment member 31.

In addition, in this embodiment, an outermost periphery of the flange portion 39 of the supply needle 32, that is, an outer periphery of the pinching portion 40 is provided with a wall portion 43 extending toward the filter attachment member 31. The wall portion 43 surrounds an outer periphery of the filter 33 to isolate the resin of the outer portion 34 which is in contact with the outer periphery from the filter 33.

Figure 5:
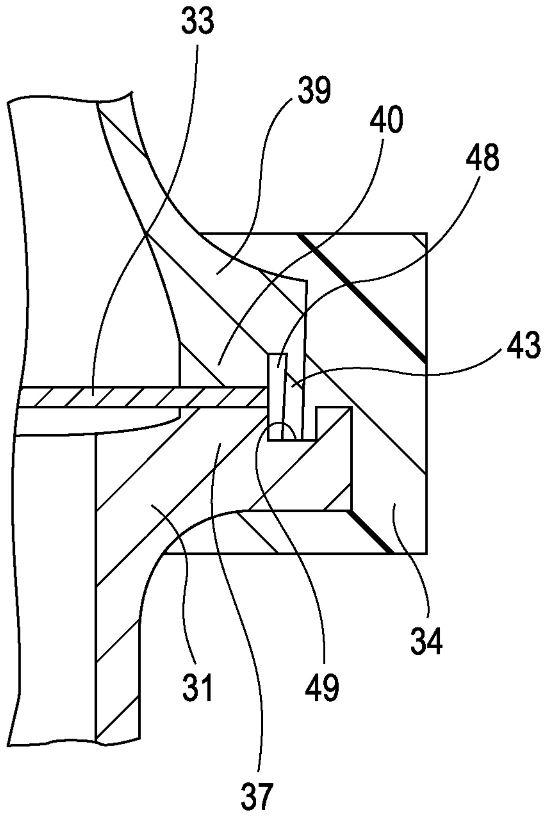
FIG. 5 is an enlarged cross-sectional view illustrating a part extracted from FIG. 4.

The wall portion 43 and a configuration in the vicinity thereof will be described in detail with reference to FIG. 5 which is an enlarged view of the extracted part. As illustrated in FIG. 5, the wall portion 43 is provided in a relatively thin part of the flange portion 39 which is integrally continuous so as to be elastically deformed, and a space 48 which faces a groove portion 49 is formed between an inner peripheral surface of the wall portion 43 and an outer peripheral surface of the filter 33. As a result, when a pressing force of the resin formed integrally during the formation of the outer portion 34 is exerted on the wall portion 43, the wall portion 43 is elastically deformed toward the space 48, thereby exhibiting a caulking effect between a front end of the wall portion 43 and the groove portion 49. Consequently, due to the caulking effect, an exertion of an injection pressure of the mold resin on the pinching portion 40 of the filter 33 or an exertion of an external force due to shrinkage can be effectively reduced. That is, the filter 33 pinched by the pinching portions 37 and 40 is isolated from the resin by the wall portion 43 during the molding of the outer portion 34, so that the filter 33 can be prevented from being wrapped by the resin. As a result, it is possible to reduce an influence of the injection pressure and the shrinkage pressure caused by the resin molding. In addition, in this embodiment, it is possible to reliably prevent the injection pressure and the shrinkage pressure, which are caused by the resin molding due to the elastic deformation accompanied with the caulking effect of the wall portion 43, from influencing the pinching portions 37 and 40.

A connection area between the penetration path 38 of the supply needle 32 and the liquid supply path 36 is provided with a filter chamber 41 which is a space with a greater inner diameter than other regions, that is, a large-width portion. For example, in this embodiment, the filter chamber 41 is formed so that its inner diameter is increased toward the filter attachment member 31. In addition, the filter chamber 41 is configured to have a larger inner diameter than other areas of the penetration path 38 by increasing an area of the filter 33 in order to reduce resistance as much as possible when ink passes through.

The filter 33, for example, has a sheet shape finely knitted with metal and is pinched between the filter attachment member 31 and the supply needle 32 as described above. In addition, in this embodiment, the outer peripheral surface of the filter 33 is aligned with outer peripheral surfaces of the pinching portions 37 and 40.

In this embodiment, the filter 33 is individually provided for each liquid supply path 36 and is isolated from the wall portion 43 and resin of the outer portion 34.

The outer portion 34 is made of the resin molded integrally with the outer peripheries of the filter attachment member 31 and the supply needle 32. In this embodiment, the single outer portion 34 is provided in the vicinity of boundaries of the plurality of the supply needles 32 and the filter attachment members 31.

The outer portion 34 is provided on the outer peripheries of the filter attachment member 31 and the supply needle 32, from end surfaces of the filter attachment member 31 and the supply needle 32 to surfaces on the opposite side to the filter 33 of the filter attachment member 31 and the supply needle 32. Accordingly, the filter attachment member 31 and the supply needle 32 are fixed and integrated with each other. That is, the outer portion 34 integrates and fixes the filter attachment member 31 and the supply needle 32 with each other while the filter 33 is pinched between the pinching portion 37 of the filter attachment member 31 and the pinching portion 40 of the supply needle 32.

As described above, as the filter attachment member 31, the supply needle 32, and the filter 33 are integrated by the outer portion 34 formed by integrated molding, an area for welding the supply needle 32 and the filter 33 to the filter attachment member 31 is unnecessary, and an interval between the adjacent supply needles 32 can be reduced, thereby achieving a decrease in the size of the head. In addition, there is no need to reduce the area of the filter 33 in order to achieve the decrease in the size of the head, and an increase in dynamic pressure is prevented so that there is no need to increase a drive voltage for driving a piezoelectric element 300.

In addition, since the filter 33 and the supply needle 32 can be fixed at the same time to the filter attachment member 31 by using the outer portion 34, there is no need to individually fix the filter 33 and the supply needle 32 to the filter attachment member 31 and a reduction in manufacturing cost can be achieved.

In addition, since the filter attachment member 31 and the supply needle 32 are fixed by the outer portion 34, a slit between the filter attachment member 31 and the supply needle 32 is prevented, thereby preventing ink from leaking from the slit. In addition, the outer portion 34 is also formed between the two supply needles 32.

Figure 6A:
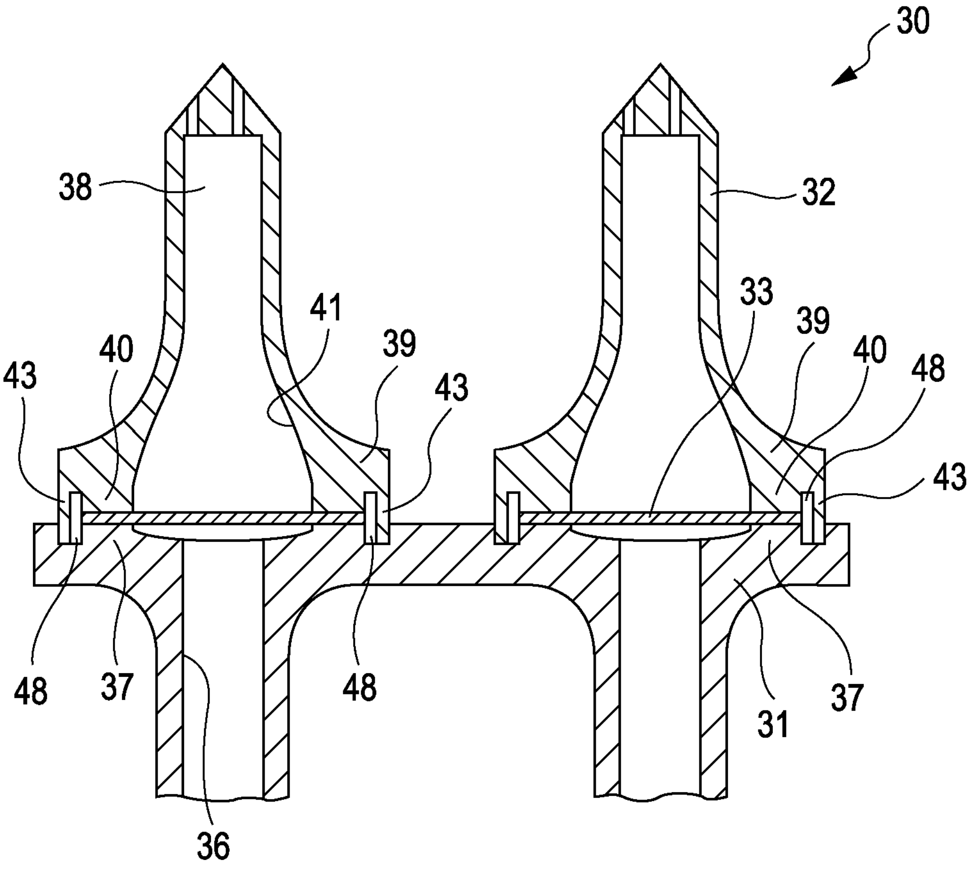
FIGS. 6A and 6B are cross-sectional views illustrating a manufacturing method of the supply member according to the embodiment of the invention.

Next, a manufacturing method of the ink jet recording head 11 as described above, and more particularly, the supply member 30 will be described in detail. FIGS. 6A to 7 are cross-sectional views illustrating the manufacturing method of the supply member.

First, as illustrated in FIG. 6A, the filter 33 is pinched between the pinching portion 37 of the filter attachment member 31 and the pinching portion 40 of the supply needle 32. That is, the filter 33 is interposed between the pinching portion 37 of the filter attachment member 31 and the pinching portion 40 of the supply needle 32 so as to be in contact with the pinching portions 37 and 40.

Figure 6B:
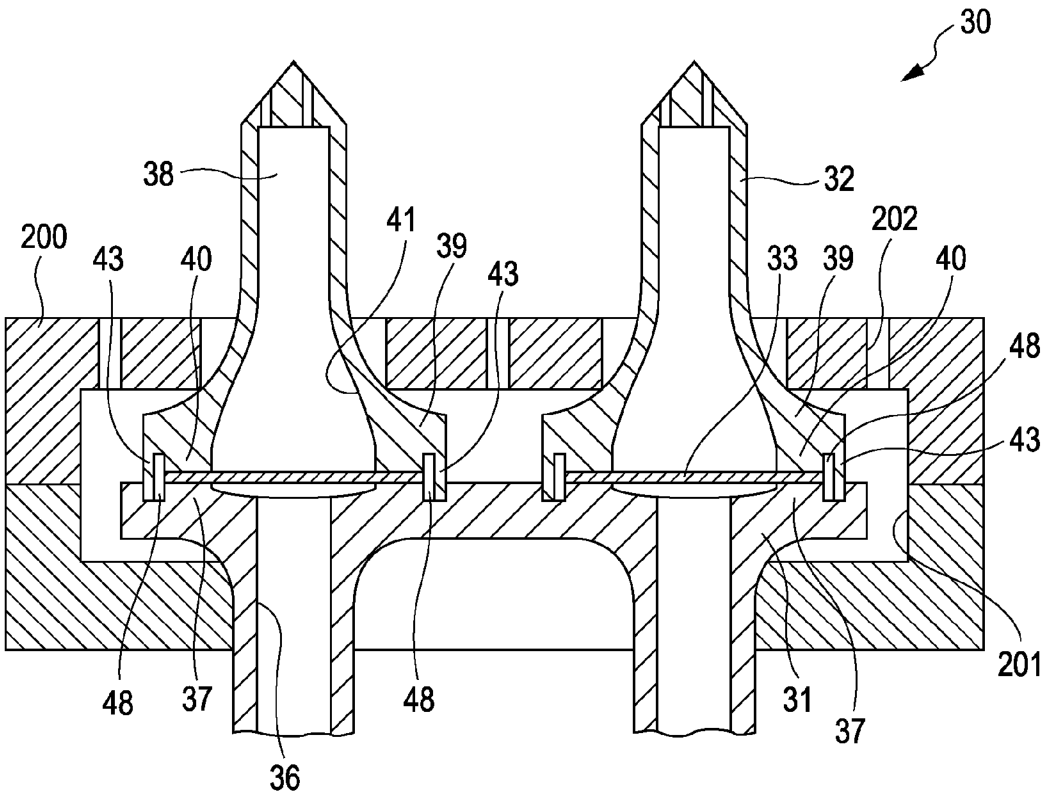
Figure 7:
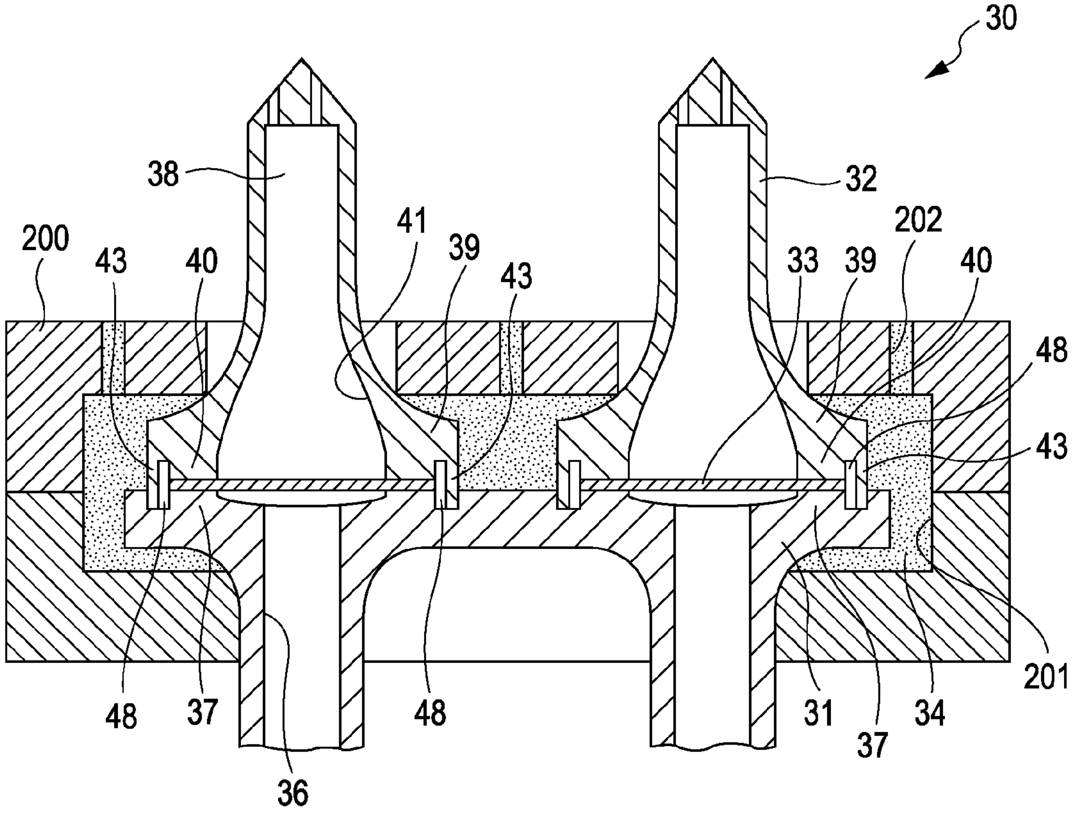
FIG. 7 is a cross-sectional view illustrating the manufacturing method of the supply member according to the embodiment of the invention.

Next, as illustrated in FIG. 6B, a mold 200 is fitted across the outer peripheries of the boundaries of the filter attachment member 31 and the supply needle 32. The mold 200 is configured by members divided into upper and lower parts and is provided with a cavity 201 therein where the outer portion 34 is to be formed. In addition, the mold 200 is provided with a gate 202 for communicating the cavity 201 to the outside.

In addition, as illustrated in FIG. 7, the supply member 30 is formed by integrally molding the outer portion 34. Specifically, a molten resin is filled in the cavity 201 via the gate 202 of the mold 200 to mold the outer portion 34. Here, a flow of the molten resin filling the cavity 201 toward the space 48 inside the wall portion 43 is inhibited. That is, the filter 33 is isolated from the resin which is in contact with the outer peripheral surface of the wall portion 43.

Accordingly, the outer portion 34 is provided over the periphery of the liquid supply path 36 and integrates and fixes the filter attachment member 31, the supply needle 32, and the filter 33.

The supply member 30 formed as described above does not require an operation for welding the filter 33 and the supply needle 32 to the filter attachment member 31, and the filter attachment member 31, the supply needle 32, and the filter 33 can be integrated and fixed by a single operation of integrally molding the outer portion 34. Therefore, the manufacturing processes can be simplified, resulting in a reduction in costs.

In addition, in this embodiment, an exertion of an external force caused by the injection pressure and the shrinkage pressure of the molded resin on the pinching portions 37 and 40 and the filter 33 can be prevented. Therefore, twisting of the filter 33 can be effectively prevented.

Figure 8:
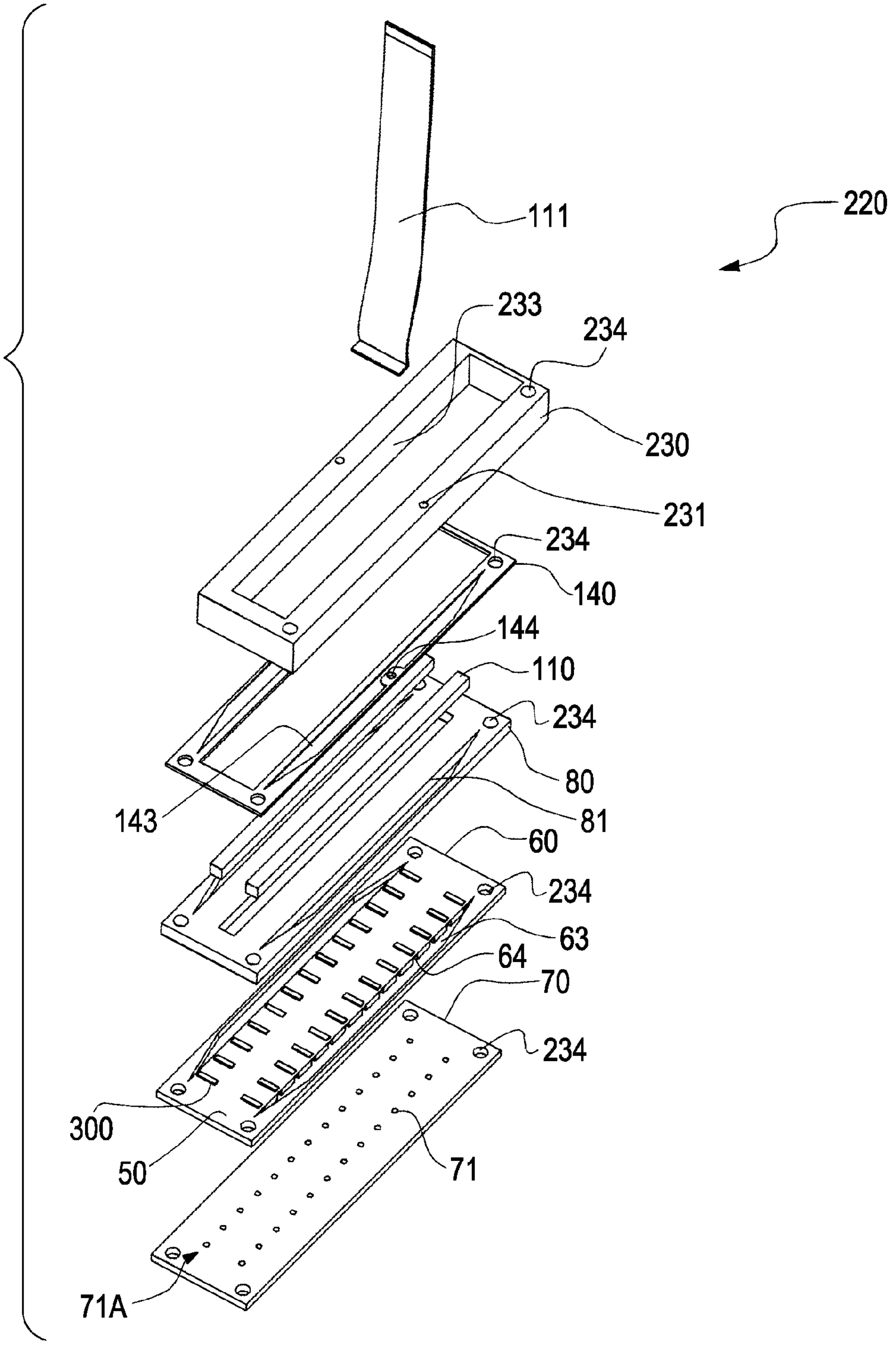
FIG. 8 is a perspective view of a breakdown illustrating a head body according to the embodiment of the invention.

In addition, on the other side of the liquid supply path 36 of the supply member 30, that is, on the opposite side to the supply needle 32, the head body 220 is provided. Here, the head body 220 will be described. FIG. 8 is a perspective view of a breakdown of the head body, and FIG. 9 is a cross-sectional view of the head body.

Figure 9:
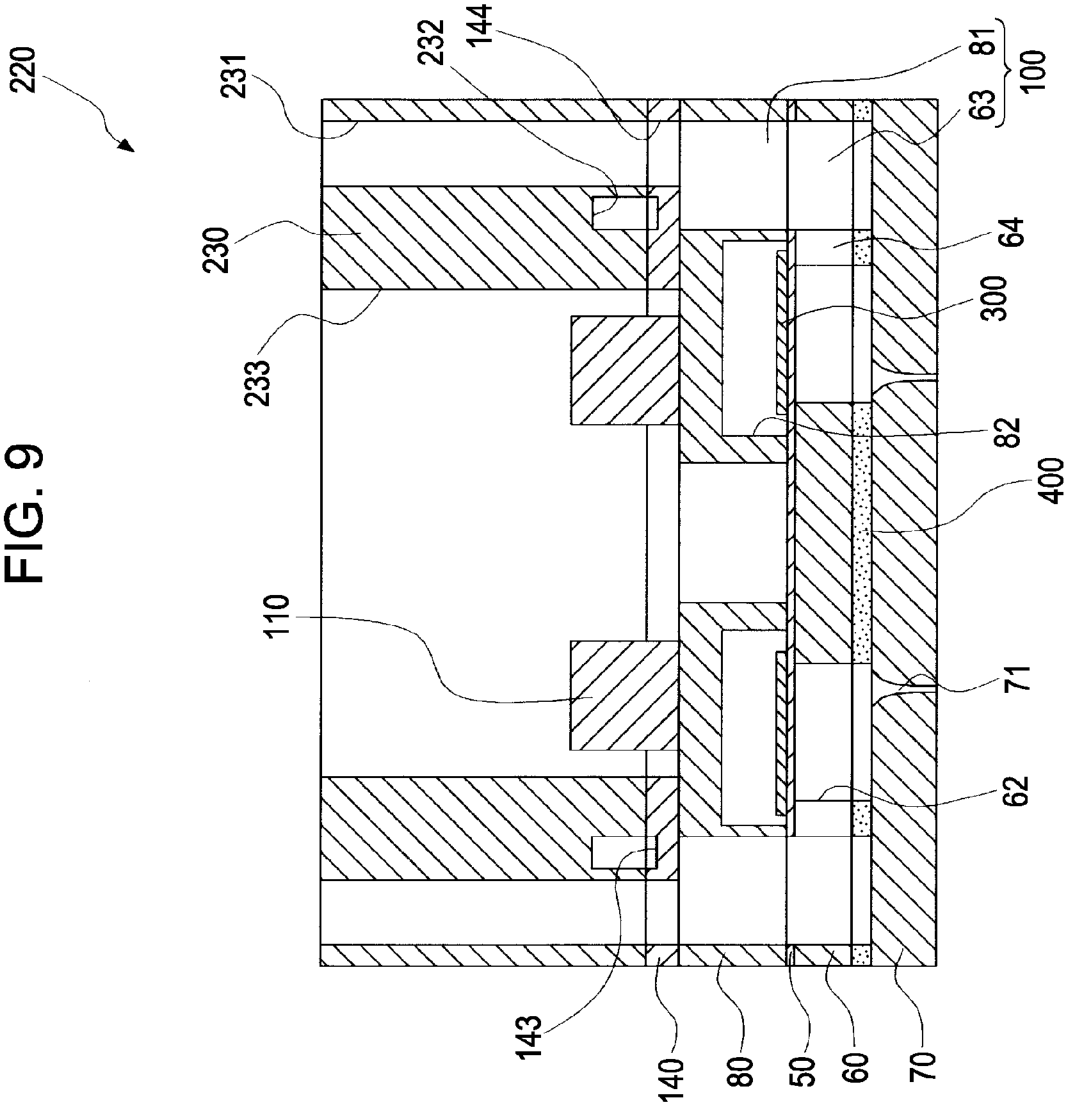
FIG. 9 is a cross-sectional view illustrating the head body according to the embodiment of the invention.

As illustrated in FIGS. 8 and 9, a channel formation substrate 60 of the head body 220 is configured as a single-crystal silicon substrate in this embodiment, and an elastic film 50 made of silicon dioxide is formed on a surface of the channel formation substrate 60. The channel formation substrate 60 is provided with two rows of pressure generating chambers 62 which are subjected to anisotropic etching from an outer side so as to be partitioned by a plurality of walls and are arranged in a width direction. In addition, a longitudinal outer side of the pressure generating chamber 62 in each row communicates with a reservoir 81 provided in a reservoir formation substrate 80 described later, and a communication portion 63 is formed which is configured of a reservoir 100 that is to be a common ink chamber of the pressure generating chambers 62. The communication portion 63 communicates with the longitudinal outer side of each pressure generating chamber 62 via an ink supply path 64. That is, in this embodiment, as the liquid channel provided in the channel formation substrate 60, the pressure generating chamber 62, the communication chamber 63, and the ink supply path 64 are provided.

In addition, a nozzle plate 70 provided with nozzle openings 71 is fixed to an opening surface side of the channel formation substrate 60 via an adhesive 400. Specifically, a plurality of the nozzle plates 70 is provided to correspond to a plurality of the head bodies 220, and the nozzle plate 70 has an area slightly wider than a exposure opening portion 241 of a cover head 240 that will be described later in detail such that the nozzle plate 70 is fixed by the adhesive or the like in an area where it overlaps with the cover head 240. In addition, the nozzle opening 71 of the nozzle plate 70 is perforated at a position communicating with an opposite side to the ink supply path 64 of each pressure generating chamber 62. In this embodiment, since the two rows of the pressure generating chambers 62 are arranged on the channel formation substrate 60, two nozzle rows 71A formed by arranging the nozzle openings 71 are provided in the single head body 220. In addition, in this embodiment, a surface, where the nozzle openings 71 of the nozzle plate 70 is open, is the liquid ejecting surface. As the nozzle plate 70, for example, a single-crystal silicon substrate or a metal substrate made of, such as, stainless steel (SUS) may be employed.

On the opposite side to the opening surface of the channel formation substrate 60, a piezoelectric element 300 formed by sequentially stacking a lower electrode film made of metal, a piezoelectric layer made of a piezoelectric material such as lead zirconate titanate (PZT), and an upper electrode film made of metal are formed on the elastic film 50.

The reservoir formation substrate 80 having the reservoir portion 81 that configures at least a part of the reservoir 100 is joined to the channel formation substrate 60 provided with the piezoelectric element 300. In this embodiment, the reservoir portion 81 is formed in the width direction of the pressure generating chamber 62 by penetrating the reservoir formation substrate 80 in the thickness direction, and communicates with the communication portion 63 of the channel formation substrate 60 as described above, thereby configuring the reservoir 100 that is to be the common ink chamber of the pressure generating chambers 62.

In addition, in an area of the reservoir formation substrate 80 opposed to the piezoelectric element 300, a piezoelectric element holding portion 82 is provided which fills a space such that it does not inhibit the movement of the piezoelectric element 300.

In addition, on the reservoir formation substrate 80, a drive circuit 110 is provided which is configured by a semiconductor integrated circuit (IC) or the like for driving each piezoelectric element 300. Each terminal of the drive circuit 110 is connected to drawn wiring drawn from individual electrodes of each piezoelectric element 300 via a bonding wire (not shown) or the like. In addition, each terminal of the drive circuit 110 is connected to an outside via external wiring 111 such as a flexible print substrate (FPC) and receives various signals such as a print signal via the external wiring 111 from the outside.

A compliance substrate 140 is joined to the reservoir formation substrate 80. An ink introduction port 144 for supplying ink to the reservoir 100 penetrates an area of the compliance substrate 140 opposed to the reservoir 100 in a thickness direction. In addition, the area of the compliance substrate 140 opposed to the reservoir 100 excluding the ink introduction port 144 is a flexible portion 143 which is thin in the thickness direction, and the reservoir 100 is sealed by the flexible portion 143. Compliance is given to an interior of the reservoir 100 by the flexible portion 143.

In addition, the head case 230 is fixed to the compliance substrate 140.

The head case 230 communicates with the ink introduction port 144 and the liquid supply path 36 of the supply member 30, and is provided with an ink supply communication path 231 for supplying ink from the supply member 30 to the ink introduction port 144. The head case 230 is provided with a groove portion 232 in an area of the compliance substrate 140 opposed to the flexible portion 143 such that flexural deformation of the flexible portion 143 suitably occurs. In addition, the head case 230 is provided with a drive circuit holding portion 233 that penetrates in the thickness direction in an area opposed to the drive circuit 110 provided on the reservoir formation substrate 80, and the external wiring 111 is inserted through the drive circuit holding portion 233 to be connected to the drive circuit 110.

In addition, as illustrated in FIG. 2, the head body 220 held by the supply member 30 via the head case 230 is positioned and held relative to the cover head 240 having a box shape to cover liquid ejecting surface sides of the five head body 220. The cover head 240 includes exposure opening portions 241 for exposing the nozzle opening 71 and a joining portion 242 which partitions the exposure opening portions 241 and is joined to at least both end sides of the nozzle openings 71 arranged in the nozzle row 71A of the liquid ejecting surface of the head body 220.

The joining portion 242 includes a frame portion 243 provided along the outer periphery of the liquid ejecting surface across the plurality of the head bodies 220, and beam portions 244 which extend between the adjacent head bodies 220 for dividing the exposure opening portions 241. The frame portion 243 and the beam portion 244 are joined to the liquid ejecting surface of the head body 220, that is, a surface of the nozzle plate 70.

In addition, the cover head 240 is provided with a side wall portion 245 extending to be bent along the outer peripheral portion of the liquid ejecting surface on the side of the liquid ejecting surface of the head body 220.

As described above, since the cover head 240 is configured to adhere the joining portion 242 to the liquid ejecting surface of the head body 220, a height difference between the liquid ejecting surface and the cover head 240 can be reduced. In addition, even if wiping of the liquid ejecting surface or a suction operation is performed, it is possible to prevent ink remaining on the liquid ejecting surface. In addition, since the adjacent head bodies 220 are separated by the beam portion 244 so as to be blocked, ink does not enter between the adjacent head bodies 220, and deterioration and breakage of the piezoelectric element 300, the drive circuit 110, and the like due to ink can be prevented.

In addition, the liquid ejecting surface of the head body 220 and the cover head 240 are adhered to each other by an adhesive without a gap, the recording medium S is prevented from being fed into the gap, thereby preventing deformation of the cover head 240 and paper jamming. In addition, since the side wall portion 245 converts the outer peripheral portion of the plurality of the head bodies 220, ink entering into the side surface of the head body 220 can be reliably prevented. In addition, since the cover head 240 is provided with the joining portion 242 joined to the liquid ejecting surface of the head body 220, each nozzle row 71A of the plurality of the head bodies 220 can be positioned and joined with respect to the cover head 240 at high precision.

For example, the cover head 240 may be made of a metal material such as stainless steel, configured by performing a press forming process on a metal plate, or formed by performing molding. In addition, the cover head 240 is made of a conductive metal material so as to be grounded.

In addition, joining of the cover head 240 and the nozzle plate 70 is not particularly limited, and for example, may be implemented by a thermo-setting epoxy adhesive, a UV-setting adhesive, and the like.

In the ink jet recording head 11 according to this embodiment, ink from the ink cartridge 13 is supplied from the liquid supply path 36, the interior from the reservoir 100 to the nozzle opening 71 is filled with the ink via the ink supply communication path 231 and the ink introduction port 144, a voltage is applied to each piezoelectric element 300 corresponding to the pressure generating chamber 62 according to a recording signal from the drive circuit 110, the elastic film 50 and the piezoelectric element 300 is bent and deformed, so that pressure in each pressure generating chamber 62 is increased, thereby discharging ink droplets from the nozzle openings 71.

Another Embodiment

While the exemplary embodiments of the invention have been described above, a basic configuration of the invention is not limited thereto. For example, in the above-mentioned embodiment, the space 48 and the groove portion 49 are formed as illustrated in FIG. 5. However, they are not necessary. The configuration is not particularly limited as long as the filter is isolated from the resin by the wall portion. That is, the configuration may not include the groove 49 or the space 48. Here, as in the embodiment, the case where the space 48 and the groove 49 are provided is the most effective, and it is possible to avoid the influence of the external force caused by the injection pressure and the shrinkage during the resin molding on the filter 33.

In addition, a wall portion may be formed on the side of the filter attachment member 31 so as to exhibit the same function as the wall portion 43. That is, the wall portion may be provided on one of the filter attachment member 31 (first supply member) and the supply needle 32 (second supply member). In this case, when the groove portion is to be formed, this is formed on the one member.

In addition, a surface of the wall portion 43 that comes in contact with the resin may be provided with the groove. In this case, it is possible to improve the adhering force due to the increase in adhered area between the wall portion and the resin.

Figure 10:
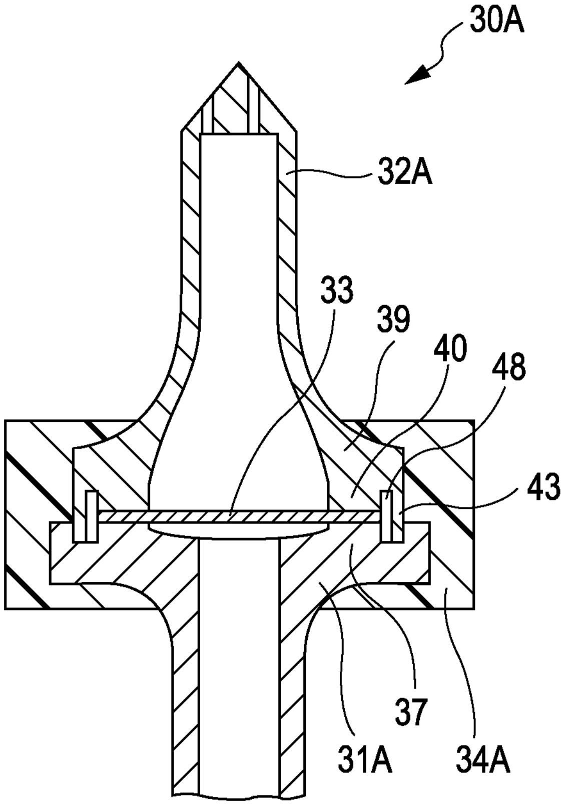
FIG. 10 is a cross-sectional view of a supply member according to another embodiment of the invention.

In addition, in this embodiment, the case where the two independent supply needles 32 correspond to the single head body 220 is described. However, the invention is not particularly limited thereto. For example, as illustrated in FIG. 10, an outer portion 34A may be provided on the outer peripheries of a filter attachment member 31A and a supply needle 32A by combining the single supply needle 32A with the filter attachment member 31A. In addition, in FIG. 10, like elements are denoted by like reference numerals of FIG. 4, and repeated descriptions thereof will be omitted.

In addition, in the above-mentioned embodiment, the ink cartridge 13 as the liquid storage unit is provided so as to be able to be attached to or detached from the supply member 30. However, the invention is not particularly limited thereto. For example, an ink tank as the liquid storage unit may be provided at a different position from the recording head 11 to connect the liquid storage unit to the recording head 11 via a supply pipe such as a tube. That is, in the above-mentioned embodiment, as the supply element, the supply needle 32 having a needle shape is exemplified. However, the supply needle is not limited to a needle shape.

In addition, in this embodiment, the ink jet recording head 11 for discharging ink droplets is exemplified to describe the invention. However, the invention can be widely applied to general liquid ejecting heads. As the liquid ejecting head, for example, a recording head used for an image recording apparatus such as a printer, a color material ejecting head used for manufacturing a color filter such as a liquid crystal display, an organic EL display, an electrode material ejecting head used for forming an electrode such as an FED (field emission display), a biological organic material ejecting head used for manufacturing a biochip, and the like may be employed.

What is claimed is:

1. A liquid ejecting head comprising:
- a head body that has a nozzle opening for ejecting liquid supplied via a liquid supply path;
- a first supply member that is provided with the liquid supply path and has an introduction port for introducing the liquid;
- a second supply member that is disposed on a downstream side of the first supply member and is provided with the liquid supply path;
- a filter that is provided between the first and second supply members to cross the liquid supply path;
- a wall portion that is integrally continuous with one of the first supply member and the second supply member; and
- an integrated molding portion that fixes the first and second supply members by resin in a state where the filter is pinched between the first and second supply members, wherein:
- the first and second supply members are provided with pinching portions for pinching the filter therebetween, and
- the wall portion has a wall surface that is provided on one of the first and second supply members, and the wall surface is provided between the filter and the resin to surround an outer periphery of the filter and prevent the filter from being wrapped by the resin.

2. The liquid ejecting head according to claim 1, wherein the other of the first and second supply members is provided with a groove portion for accommodating at least a part of the wall portion.

3. The liquid ejecting head according to claim 2,
- wherein the wall portion is able to be elastically deformed, and
- a space that faces the groove portion is provided between an inner peripheral surface of the wall portion and an outer peripheral surface of the filter.

4. The liquid ejecting head according to claim 1, wherein a surface of the wall portion which is in contact with the resin is provided with a groove.

5. A liquid ejecting apparatus comprising:
- a liquid ejecting head that includes:
- a head body that has a nozzle opening for ejecting liquid supplied via a liquid supply path;

a first supply member that is provided with the liquid supply path and has an introduction port for introducing the liquid;

a second supply member that is disposed on a downstream side of the first supply member and is provided with the liquid supply path;

a filter that is provided between the first and second supply members to cross the liquid supply path;

a wall portion that is integrally continuous with one of the first supply member and the second supply member; and an integrated molding portion that fixes the first and second supply members by resin in a state where the filter is pinched between the first and second supply members, wherein:

the first and second supply members are provided with pinching portions for pinching the filter therebetween, and the wall portion has a wall surface that is provided on one of the first and second supply members, and the wall surface is provided between the filter and the resin to surround an outer periphery of the filter and prevent the filter from being wrapped by resin.

6. The liquid ejecting apparatus according to claim 5, wherein the other of the first and second supply members is provided with a groove portion for accommodating at least a part of the wall portion.

7. The liquid ejecting apparatus according to claim 6, wherein the wall portion is able to be elastically deformed, and a space that faces the groove portion is provided between an inner peripheral surface of the wall portion and an outer peripheral surface of the filter.

8. The liquid ejecting apparatus according to claim 5, wherein a surface of the wall portion which is in contact with the resin is provided with a groove.

* * * * *